O. W. LIND.
VALVE LIFTER.
APPLICATION FILED OCT. 9, 1919.

1,366,573.

Patented Jan. 25, 1921.

Otto W. Lind,
Inventor
By Frank Carlson
His Attorney.

UNITED STATES PATENT OFFICE.

OTTO WALFRED LIND, OF NEW YORK, N. Y.

VALVE-LIFTER.

1,366,573.  Specification of Letters Patent.  Patented Jan. 25, 1921.

Application filed October 9, 1919. Serial No. 329,457.

*To all whom it may concern:*

Be it known that I, OTTO WALFRED LIND, a citizen of the United States, and a resident of 351 East 57th street, in the city, county, and State of New York, have invented certain new and useful Improvements in Valve-Lifters, of which the following is a specification.

This invention relates to valve lifters, and especially to that class wherein a bracket has a bifurcated lower extremity adapted to engage a valve spring and upon its upper extremity a link connected to a lever operating a plunger which passes directly through said upper portion.

The chief aims of this invention are to provide a valve lifter which is convenient to use and easy to adjust to different automobile engines, being primarily simple in construction and perfectly accurate in its operation.

Figure 1:
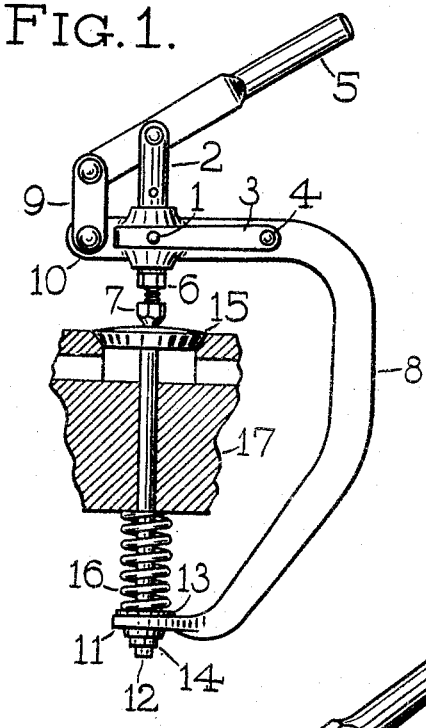
Figure 2:
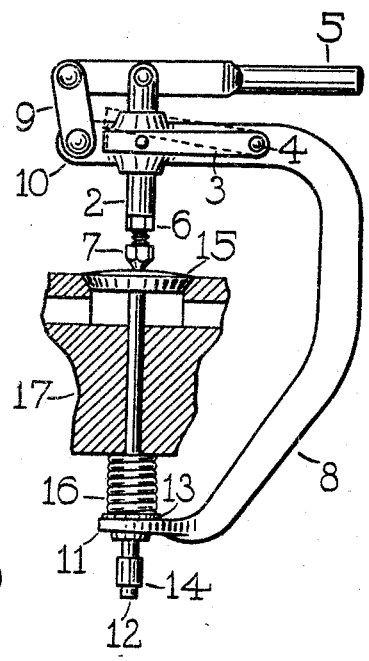
Figure 3:
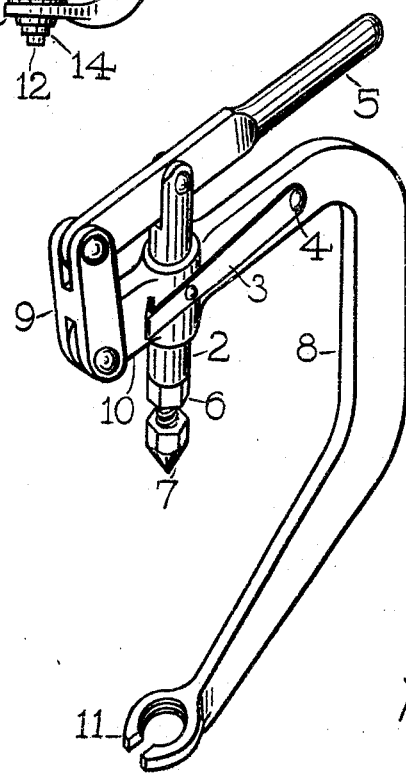

These ends I attain by the herein described invention illustrated in the drawing, in which Figure 1 is a view of a valve lifter made in accordance with said invention when the same is in the starting operative position. Fig. 2 is a similar view of the same when the second operative position has been attained. Fig. 3 is a perspective view of the invention illustrated in the preceding views.

It is well known that the springs controlling the valves on gasolene engines as found on most automobiles are quite powerful and cause therefore trouble and delay when it is desired to remove the valves for regrinding. In order to instantly overcome the spring involved and expose the key or split collar that retains the spring and its washer on the valve stem the present invention has been designed.

A fragment 17 of an engine is equipped with a valve 15 having a stem 12, and upon the latter are mounted washer 13 and split collar 14. Between the washer 13 and the valve block 17 is found a spring 16, which by bearing down on the mentioned washer tends to hold valve head 15 down in its seat in block 17. When it is required to remove this valve, the bracket 8 is so introduced that its bifurcated portion 11 engages washer 13, and the hexagonal point 7 of plunger 2 accurately engages the center of valve 15. It may be said at this point, that, if the part 7 does not touch the valve, or is too long to be set in position upon valve 15, the lock nut 6 may be loosened and point 7 screwed up or down so that it just clears the valve. Then the lock nut 6 may be tightened and the apparatus will be in the position illustrated in Fig. 1. The plunger 2 in reality forms a fulcrum for lever 5, and when depressed into the position shown in Fig. 2, the link 9 pinned to its flat extremity will draw up the extremity 10 of the bracket 8 and consequently the whole of the latter. Naturally, this raises the washer 13 and the superincumbent spring so as to expose the split collar 14, which is then easily accessible and removable.

Upon the side of the bracket is secured a flat spring 3 by means of a rivet 4. The spring is furnished with an inwardly extending pin 1 which passes freely into the swelled part of the bracket 8 and is adapted to engage the hole shown in Fig. 1 in plunger 2. When thus engaged, the parts will retain the position shown in Figs. 2 and 3. Sometimes it may be desired to have the spring 3 idle, and this is accomplished by moving the same up to the position indicated by the dotted lines in Fig. 2.

However, returning to the operation of the invention, when the split collar 14 has been removed; while one hand holds the lever 5, a finger may be inserted under the outer bent extremity of spring 3 to disengage the pin 1 from the plunger, when the spring 16 and its washer 13 will be instantly released and when the lifter is removed, the valve may be freely lifted out. The whole operation may be done several times in a single minute.

Replacing the valve is naturally a reversal of the foregoing operations.

Having thus fully described my invention, I desire to secure by U. S. Letters Patent:

A valve lifter including a C bracket provided with a bifurcated lower extremity and in its upper portion with a plunger passing therethrough in alinement with said bifurcated portion, a lever attached to said plunger and means to lock said plunger in depressed position including a spring upon said bracket provided with an inwardly extending pin adapted to engage a hole in said plunger.

Signed at 132 Nassau street, in the borough of Manhattan, in the county of New York, city and State of New York, this 7th day of October, 1919.

OTTO WALFRED LIND.

Witnesses:
FRANK CARLSON,
CARL F. WM. FORSSBERG.